United States Patent Office 2,989,375
Patented June 20, 1961

---

2,989,375
PRODUCTION OF BORON TRIBROMIDE
Frank H. May, Whittier, and James L. Bradford, Anaheim, Calif., assignors to American Potash & Chemical Corporation, a corporation of Delaware
No Drawing. Filed Dec. 7, 1956, Ser. No. 626,828
2 Claims. (Cl. 23—205)

This invention relates to the manufacture of boron tribromide.

Boron tribromide, BBr₃, has only been available heretofore by processes requiring either relatively expensive or rare starting materials or extreme reaction conditions. For example:

A. B. Poggiale in 1846 heated boric oxide and carbon in a stream of bromine at "red heat" to produce boron tribromide:

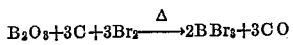
$$B_2O_3 + 3C + 3Br_2 \xrightarrow{\Delta} 2BBr_3 + 3CO$$

F. Wohler and H. St. C. De Ville in 1857 heated the elements together to produce the product at "dull red heat":

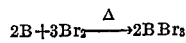
$$2B + 3Br_2 \xrightarrow{\Delta} 2BBr_3$$

G. Gustavson in 1874 produced boron tribromide by heating boric oxide and phosphorus pentabromide in a sealed tube at 140° C.:

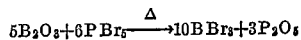
$$5B_2O_3 + 6PBr_5 \xrightarrow{\Delta} 10BBr_3 + 3P_2O_5$$

H. Moissan in 1895 noted that upon heating boron sulfide with bromine, boron bromide and sulfur resulted:

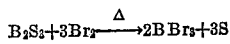
$$B_2S_3 + 3Br_2 \xrightarrow{\Delta} 2BBr_3 + 3S$$

Moissan also claimed that although boron carbide and chlorine react at 1000° C. to produce boron chloride and carbon, under similar conditions, "bromine and iodine have no action."

We have found that boron tribromide may be produced by the bromination of boron carbide at above about 800° to 1000° C., the resulting product being condensed and purified by fractional distillation. The temperature employed should be at least 900° C. We prefer to operate at 850° C. and above because below that temperature a product is secured which contains bromine which is either free or is readily liberated.

To carry out the process, a large Vycor glass reactor was fitted with a gas feed tube and an off-gas exit port; all joints were standard taper ground glass. The reactor was followed by a tap water condenser, a product receiver, and a dry ice-acetone trap which was vented into an exhaust hood. Bromine vapor was produced in a small boiler, the rate of boil-off being regulated by the boiler heat input. The vapor passed through an insulated tube into the Vycor reactor. A manometer was attached to the insulated tube to measure back pressure. The reactor was partially filled with boron carbide "gravel" screened to pass ½ inch mesh.

A first run was made at a reactor temperature of 900° C. and a bromine flow rate of 150 gms./hour. The product contained a small amount of free bromine, estimated at less than 5 percent. The bromine was readily removed by reaction with mercury, although this did not completely remove the reddish-brown color of the crude product.

Another run was made at a reactor temperature of 950° C. and a bromine flow rate of 200 gms./hour. The product was essentially free from bromine, as evidenced by the lack of bromination of mercury. The product had a reddish-brown color; it was postulated that this color was due to sublimed bromide salts formed from the impurities, probably iron tribromide.

The crude products from these runs were composited and distilled to separate out the various impurities. This distillation was carried out in a flask equipped with a vacuum-jacketed Vigreaux column and an integral water-cooled condenser. The first fraction removed the traces of bromine and other low-boiling constituents.

The second fraction, taken off in the boiling range 90°–92° C., consisted of the purified boron tribromide. Analysis of the purified product gave the following results:

|  | Percent B | Percent Br | Br/B | Density, gms./cm.³ |
|---|---|---|---|---|
| Purified Product | 4.37 | 95.54 | 2.98 | 2.60 |
| Theoretical BBr₃ | 4.33 | 95.67 | 3.00 | 2.62 |

In appearance it is a colorless liquid with a measured density of 2.60 gms./cm.³ at room temperature. Approximately 2 pounds of high purity boron tribromide were obtained from approximately 3 pounds of crude product. This yield could be greatly increased by recycling the first fraction and the pot residue under continuous processing.

In another run using a brick furnace of one square foot cross section, heated with graphite resistance rods to above 900° C., 150 pounds of the boron tribromide was produced in 9 hours by passing bromine vapor at rates up to 40 pounds per hour over a fixed bed of boron carbide. The boron carbide was of ¾" and finer size and of commercial purity (90% B₄C).

We claim:
1. A process for the manufacture of boron tribromide comprising contacting boron carbide with bromine at a temperature between about 800° C. and 1000° C. to form boron tribromide, the bromine being in excess of that required to form boron tribromide
2. A process for manufacture of boron tribromide comprising passing a stream of bromine over a mass of boron carbide in a reaction zone at a temperature between about 800° and 1000° C. to form gaseous boron tribromide, and removing a stream of the boron tribromide from the reaction zone.

References Cited in the file of this patent

UNITED STATES PATENTS 2,369,214    Cooper _____ Feb. 13, 1945

OTHER REFERENCES

Mellor: Comprehensive Treatise on Inorganic and Theoretical Chemistry (1924), vol. 5, part 1, page 27 (1927), col. 7, page 88.

Latimer and Hildebrand: Reference Book of Inorganic Chemistry, 3rd ed., The Macmillan Co., N.Y., 1951, page 86.